United States Patent [19]
Molas

[11] 4,446,605
[45] May 8, 1984

[54] CLAMP

[76] Inventor: Eugeni C. Molas, Urbanizacion Fournier, casa 1, La Garriga (Barcelona), Spain

[21] Appl. No.: 355,924

[22] Filed: Mar. 8, 1982

[30] Foreign Application Priority Data

Mar. 25, 1981 [ES] Spain .................................... 257461

[51] Int. Cl.³ .............................................. B65D 63/02
[52] U.S. Cl. ................................... 24/277; 24/20 LS; 24/22
[58] Field of Search .................... 24/20 LS, 22, 23 R, 24/23 B, 135 N, 243 B, 257, 275, 276, 277; 248/74.1; 292/256.71, 256.73

[56] References Cited

U.S. PATENT DOCUMENTS

| 235,931 | 12/1880 | Broughton | 24/22 |
| 356,353 | 1/1887 | Eaton | 24/135 N |
| 660,245 | 10/1900 | Bunte et al. | 24/276 |
| 2,495,622 | 1/1950 | Arbogast | 24/279 X |
| 4,310,956 | 1/1982 | Meckstroth et al. | 24/275 X |

FOREIGN PATENT DOCUMENTS 2024358 1/1980 United Kingdom .............. 24/243 E

Primary Examiner—Robert P. Swiatek
Attorney, Agent, or Firm—Steinberg & Raskin

[57] ABSTRACT

A clamp has a split ring with projections extending outwardly from shoulders on the ring. The projections converge towards each other outwardly of the ring and have grooves onto which a nut is threaded. This causes the projections to be moved towards each other thereby closing the gap in the ring, and tightening the clamp. The inward movement of the projections is facilitated by grooves in the shoulders. A rib and projections are provided on the radially inner surface of the ring to facilitate the gripping of a body clamped by the clamp. A strengthening rib and handles are provided on the radially outer surface of the ring. The clamp is simple and secure and can be manufactured cheaply from a plastics material.

6 Claims, 4 Drawing Figures

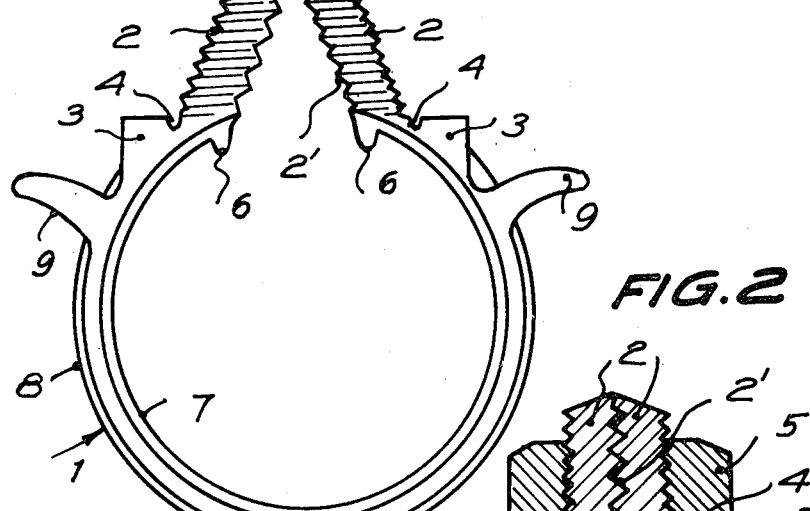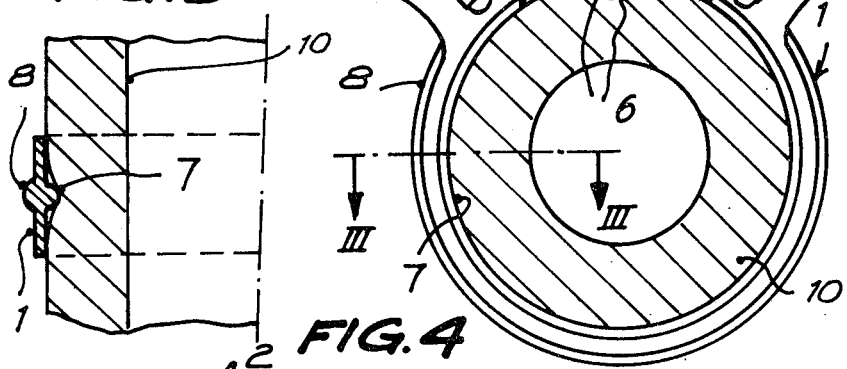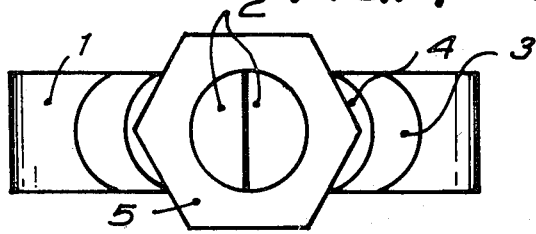

CLAMP

BACKGROUND OF THE INVENTION

The present invention relates to a clamp.

Very many assemblies exist which require the use of a clamp, e.g. when connecting pipes, clamping rods and similar structures. Known clamps have different shapes and constructions but all are difficult to fit onto the body to be clamped and/or do not match the body to be clamped sufficiently accurately to ensure effective clamping.

SUMMARY OF THE INVENTION

The principal object of the invention is to provide a clamp of simple structure which functions efficiently, effectively and reliably to provide absolute security in operation.

An object of the invention is to provide a clamp of simple construction which is inexpensive and economical in manufacture.

Another object of the invention is to provide a clamp which may be manufactured inexpensively from plastic material, and functions with absolute security.

The clamp of the invention is a split ring, the split of which is at least partially closed when the clamp is tightened. This closing is brought about by the bringing together of two projections extending from the split ends of the rings which converge towards each other outwardly of the ring. A member is received over the projections and engages securing means, e.g. grooves on each projection, the movement of the member towards the ring bringing the projections together.

Preferably, the member is a nut with an internally threaded bore which engages grooves forming the securing means. Alternatively, a bayonet fitting may be used.

The clamp of the invention is preferably formed from a moulded plastic material having the required degree of elasticity and strength.

The projections may originate from shoulders on the ring adjacent its split, the shoulders having depressions or grooves which provide a certain degree of flexibility allowing the projections to be brought together when the nut is fitted.

The clamp may be formed by an integral moulded unit in a suitable plastics material, which should preferably possess a degree of flexibility.

The radially inner surface of the ring may have projections adjacent the split, and/or a rib which extends around the inner surface of the ring, these being designed to be forced against the body to which the clamp is applied, in order to increase its retaining action. The ring may also be provided with an external rib, which provides reinforcement.

The ring may be provided, at a region close to its ends, with handles to facilitate handling of the clamp when it is being located around the body to be clamped.

BRIEF DESCRIPTION OF THE DRAWINGS

For a fuller understanding of the invention, reference is had to the following description, taken in connection with the accompanying drawings, in which:

FIG. 1 is a side view of an embodiment of the clamp of the invention in its unmounted state;

FIG. 2 is a side view, partially in cross-section, of the embodiment of FIG. 1 mounted on a body to be clamped;

FIG. 3 is a sectional view, taken along the lines III—III, of FIG. 2; and

FIG. 4 is a top plan view of the embodiment of FIGS. 1 to 3.

DESCRIPTION OF THE PREFERRED EMBODIMENT

Figure 5A:
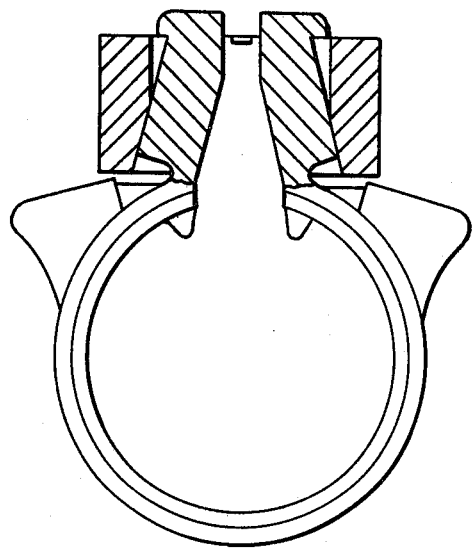
Figure 5B:
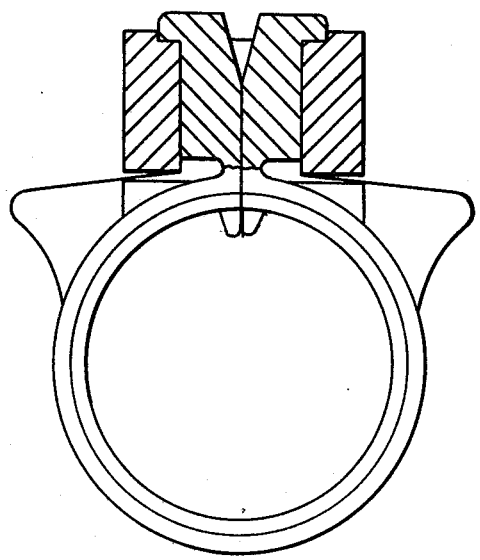

As seen in FIGS. 1 and 3, the clamp of the invention consists of a split ring 1 of thermoplastic material, formed in one piece, which is open at its ends. Each end has an external projection in the form of a half-shank 2. The projections 2 are threaded and arranged symmetrically and able to be mutually connected in order to form one single radial shank when the clamp is tightened. The half-shanks 2 project in a mutually converging fashion when the clamp is in its rest state.

The projections 2 are provided with teeth 2' on their internal face which interlock with each other when the said projections are brought together, thus completing their mutual coupling and mating.

As well as being provided with the half-shanks 2, the ring 1 is provided with projecting shoulders 3, having grooves 4 which provide the necessary degree of flexibility to permit said half-shanks to become mutually coupled as a result of the application of a nut 5 which is screwed onto them. The nut 5 which applies pressure to the half shanks 2 may have a non-continuous alternative type of thread. Furthermore, discontinuous parts, or a bayonet fitting, may be used instead of the nut 5.

The radially inner surface of the ring 1 is provided with projecting parts 6 adjoining or adjacent its ends and with an annular rib 7. The projections 6 and the rib 7 grip the body 10 to be clamped when the clamp is tightened.

The radially outer surface of the ring 1 is also provided with an annular reinforcing rib 8. The external rib 8 gives greater strength to the ring 1, so that the clamp is able to withstand greater forces applied to it.

Handles 9 in the form of arcuate projections are provided on the ring adjacent the shoulders 3. The handles 9 facilitate manual handling of the clamp and enable it to be closed manually in order to bring the half-shanks 2 together so that the nut 5 can be applied.

Referring to FIGS. 2 and 4, when the clamp is located around the body 10, it is necessary to bring the half-shanks 2 close together, using the handles 9 and the screw on the nut 5. This gradually brings the projections 2 together, so that the clamp 1 is tightened around the body 10. The moving of the projections 2 into contact is performed under pressure and is possible due to the flexibility provided by the grooves 4 in the shoulders 3.

The clamping and fitting action of the clamp consequently takes place in a gradual manner, thus providing progressive clamping of the body 10 under a force which is significantly greater than the force required to screw down the nut 5.

The pressure of the clamp on the body 10 ensures that the body is fastened in a rigid manner, and at the same time, the projections 6 and the rib 7 are forced against the outer surface of the body (FIG. 3), which helps to maintain the clamp in fixed position on the body.

The invention is by no means restricted to the aforementioned details which are described only as examples; they may vary within the framework of the invention, as defined in the following claims.

It will thus be seen that the object set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A clamp, comprising
   a ring having two ends defining a split in said ring, two projections extending outwardly from said ring, each of said projections being integrally formed with said ring adjacent a respective one of said two ends, each of said projections having an inner surface and an outer surface, the inner surface of each of said projections opposing the corresponding inner surface of the other of said projections and the outer surface of each of said projections being the farthest part of that projection from the corresponding outer surface of the other of said projections;
   securing means provided on said outer surfaces of said two projections;
   a member adapted to be received on said projections and engage with said securing means, inward movement of said member on said projections causing said projections to move towards each other, thereby causing said two ends of said ring to be brought towards each other, whereby a body passing through said ring is gripped thereby;
   handles provided on said ring and extending outwardly therefrom to facilitate manual handling of said clamp;
   projecting parts formed in said ring adjacent said split and extending substantially radially from the inner surface of said ring, said projecting parts being forced against said body when said clamp is tightened; and a plurality of interengaging means formed on the inner surfaces of said two projections.

2. A clamp as claimed in claim 1, wherein said member has an internally threaded bore and said securing means comprises a plurality of grooves forming part-threads in said outer surfaces of said projections, said grooves engaging said internally threaded bore of said member when said member is received on said projections.

3. A clamp as claimed in claim 1, wherein said member and said securing means form a bayonet fitting.

4. A clamp as claimed in claim 1, said interengaging means comprising teeth provided in said inner surfaces of said projections, said teeth being adapted to engage and interlock when said inner surfaces are brought into contact with each other, and further comprising at least one reinforcing rib on the radially outer surface of said ring.

5. A clamp as claimed in claim 1, wherein said ring includes shoulders provided on said ring adjacent said split, said projections extending from said shoulders, and said shoulders have grooves formed therein to increase the flexibility thereof.

6. A clamp as claimed in claim 1, wherein at least one annular rib is provided on the radially inner surface of said ring, said rib being forced against said body when said clamp is tightened.

* * * * *